United States Patent [19]
Reitz

[11] 3,863,397
[45] Feb. 4, 1975

[54] WOODWORKING JIG

[76] Inventor: Arnold B. Reitz, 3735 Capri Dr., Santa Barbara, Calif. 93105

[22] Filed: Jan. 18, 1974

[21] Appl. No.: 434,442

[52] U.S. Cl. .............................................. 51/131
[51] Int. Cl. ...................... B24b 5/00, B24b 29/00
[58] Field of Search .... 83/439; 51/131, 132, 145 R, 51/124, 237 R, 51, 50 R, 79, 105 R, 165.8, 165.81, 216 T; 76/43, 47, 71, 99; 264/57, 71

[56] References Cited
UNITED STATES PATENTS
2,325,826  8/1943  Barrett................................ 51/124
2,642,758  6/1953  Styles................................ 51/124 X Primary Examiner—Othell M. Simpson
Attorney, Agent, or Firm—Norman E. Reitz

[57] ABSTRACT

A woodworking jig for producing round workpieces employs a floating casting which is moveably mounted between two fixed position end castings, said floating casting rotatably supporting in a detachable attachable manner a workpiece so that the edge of the workpiece may be brought into contact with a rotatable planar member having a sanding disk attached thereto.

3 Claims, 3 Drawing Figures

PATENTED FEB 4 1975 3,863,397
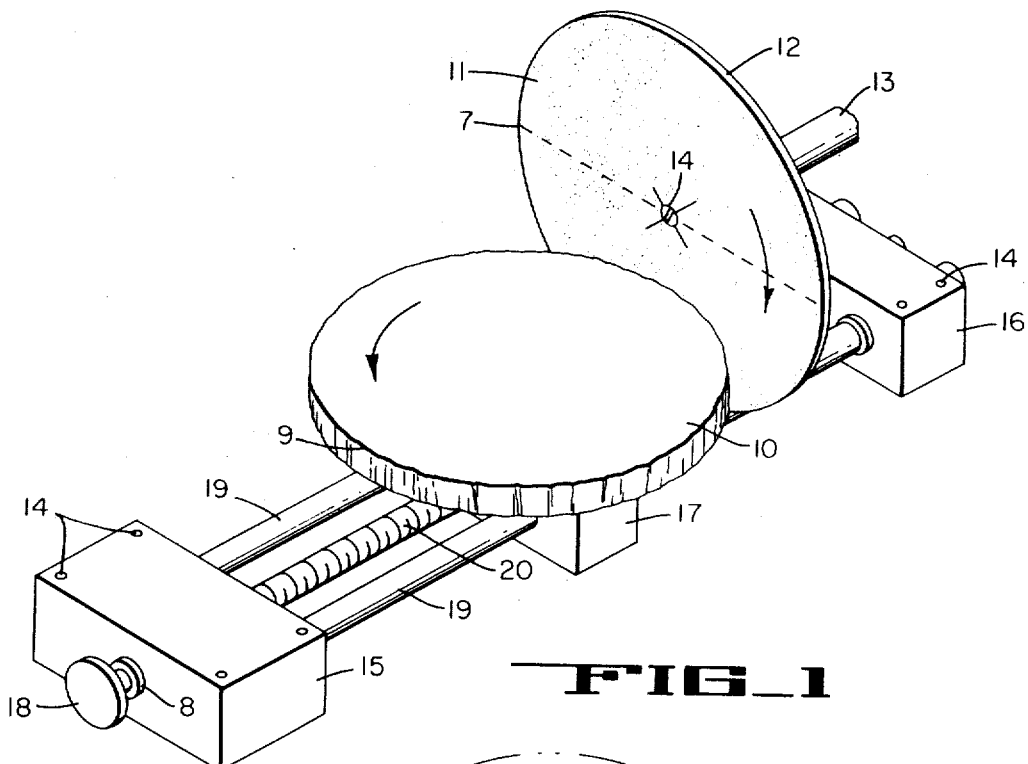
FIG_1
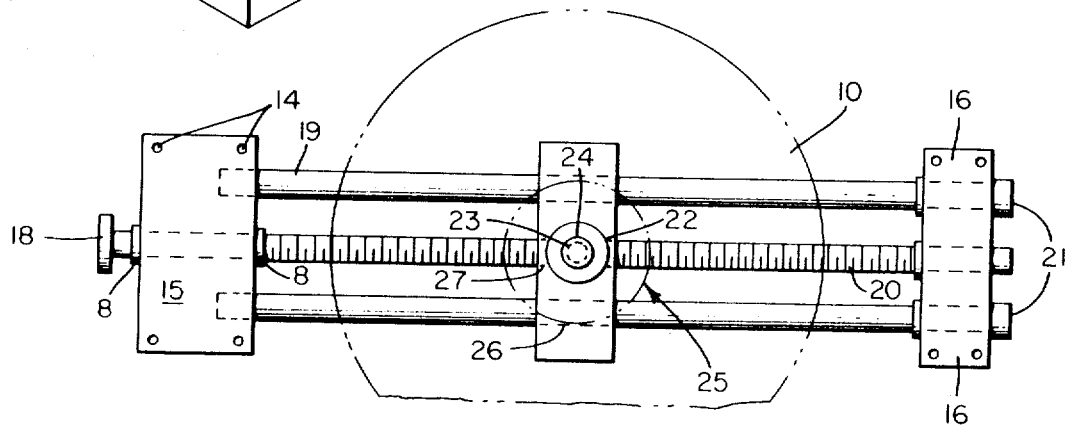
FIG_2
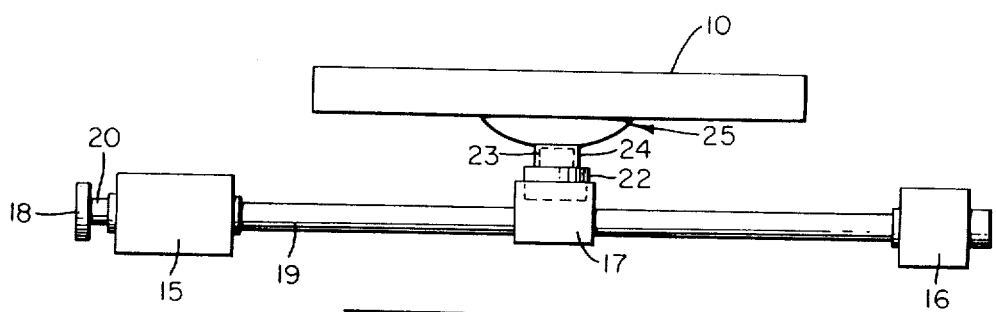
FIG_3

3,863,397

WOODWORKING JIG

This invention relates to woodworking jigs and, more particularly, relates to a jig for producing round workpieces using a circular sanding surface.

In the carpentry trade and among woodworking hobbyists it is the practice to prepare round workpieces by inscribing a circular pattern on the wood to be worked. The workpiece is then hand-held and presented to a flexible moving saw blade. Typically a band saw or jig saw is employed; a rigid saw blade such as a rotary blade would not work because the blade would bind against the wood as the circumference of the workpiece was traversed. Alternatively, the workpiece may be clamped, glued or nailed in place and a portable saw such as a sabre saw or keyhole saw is moved around the inscribed circular pattern; a router could also be used. Both of these procedures require the employment of a special tool and expose the operator to possible serious injury, especially if power saws are used. Furthermore, a steady hand is mandatory if a perfectly round circular workpiece is to be produced; even with a steady hand usually some sanding of the cut edge is required.

Another procedure employed to produce circular workpieces is to determine the approximate center of a circular workpiece to be formed and establish a pivot for the workpiece on that point. The pivot can be established, for example, by forcing the workpiece onto a sharp pivot placed in close proximity to a flexible moving saw blade so that the workpiece may be manually rotated about the pivot and into the saw blade. Or the workpiece can be centrally mounted on a circular backing and rotated through a flexible moving saw blade.

It is therefore an object of the present invention to provide a woodworking jig for producing circular workpieces which does not require the operator to rotate the workpiece through a flexible moving saw blade.

It is a further object of the present invention to provide a woodworking jig for producing circular workpieces which does not require the use of a special tool or saw.

It is another object of the present invention to provide a woodworking jig for producing circular workpieces which does not require the circumference of the workpiece to be separately sanded in order to obtain a smooth, perfectly round surface.

It is also an object of the present invention to provide a woodworking jig for producing a round workpiece using a circular sanding surface.

BRIEF DESCRIPTION OF THE DRAWINGS

For more complete understanding of the woodworking jig of the present invention reference may be had to the accompanying drawing which is hereby incorporated herein and in which:

FIG. 1 is a perspective view of the woodworking jig of the present invention positioned adjacent a rotatable plate with a sanding sheet attached thereto;

FIG. 2 is a plan view of the woodworking jig; and

FIG. 3 is a side view of the woodworking jig.

SUMMARY OF THE INVENTION

A workpiece to be smoothly finished into a circular form is selected from generally square stock or is first roughly cut into a generally square or circular shape. The workpiece is then mounted onto a chuck which is fitted over a male drive shaft so the workpiece may freely rotate. The drive shaft is seated in a floating casting which may be moved logitudinally with respect to the side of a rotating plate which has a sanding sheet mounted thereon.

In operation the workpiece is forced against the sanding sheet on the rotating plate. The workpiece is firmly held by hand and moved against, or rotated against, the sanding disc. If the workpiece were allowed to freely turn in response to the imparted torque, it would turn much too rapidly and would be dangerous. To bevel the edges of the workpiece the surface of the sanding disc would be set at an angle with respect to the edge of the workpiece; this angle may readily be obtained by tools such as a radical arm saw.

DESCRIPTION OF THE PREFERRED EMBODIMENT

Reference may now be had to FIG. 1 which clearly illustrates the manner in which the woodworking jig of the present invention produces smoothly finished round workpieces. A workpiece is rotatably mounted on a floating casting 17. Floating casting 17 is guided, by a means described below, in a direction which intersects the plane of rotating plate 12. This direction may coincide with the orientation of center shaft 13 of rotating plate 12 or be parallel therewith in which case the smoothly finished edge of workpiece 10 will describe a cylinder. If the direction is skew with respect to the orientation of center shaft 13 then the corners of the circumference will be bevelled.

As shown in FIG. 1 the sanding plate 12 is positioned over a portion of the woodworking jig. Space limitations may dictate that the woodworking jig be set up adjacent the rotating plate 12 especially if the rotating plate is part of an existing power tool such as a rotary sawblade; in this case workpiece 10 is simply extended beyond end casting 16. In any event the rough edge 9 of workpiece 10 may be brought into engagement with any part of the sanding disk 11 attached to rotating plate 12 except, perhaps, the precise center thereof where mounting means 14 attaches rotating plate 12 to center shaft 13. The force imparted to workpiece 10 which will tend to cause it to rotate will depend on the distance of the point of contact from the axis of center shaft 13 and the distance from null line 7 (a line through the center of sanding disc 11 parallel to the plane of workpiece 10). If the point of contact is along null line 7 abrasion will occur but workpiece 10 will not rotate. If the point of contact is above null line 7 the workpiece 10 will rotate in a clockwise direction as viewed from above; however, there will be an upward vector force which will tend to lift the workpiece off the male drive shaft. If the point of contact is below null line 7 the workpiece 10 will rotate in a counterclockwise direction; in this case there is downward vector force tending to keep the workpiece on the jig, making this a preferred embodiment. The forced rotation of the workpiece will bring all points on its circumference in contact with sanding disk 11 and will eventually produce a smoothly finished round workpiece.

The woodworking jig is preferrably fabricated from heavy materials so it will absorb the intermittent forces transmitted by sanding disk 11 to the rough edge 9 of the unfinished workpiece. In most cases, however, the jig will have to be securely mounted in order to absorb these forces. Channels 14 are provided in both front end casting 15 and in rear end casting 16 which can be used with bolts which are attached to a workshop bench. When so attached, front end casting 15 and rear end casting 16 provide a stable support for the moveable parts of the jig.

As seen in FIG. 2 floating casting 17 has a pair of smooth internal bores 26 which permits it to ride on guide rods 19. Floating casting 17 also has a threaded internal bore 27 which permits it to move as threaded drag rod 20 is turned. It is evident that drag rod 20 is turned by control wheel 18 which extends beyond front end casting 15 and that the smooth internal bore of collar 8 allows drag rod 20 to rotate without moving laterally with respect to front end casting 16. Guide rods 19 are permanently seated in end castings 15 and 16 so there is no movement of end casting 15 with respect to end casting 16.

The rotation mechanism is clearly illustrated in FIG. 3. Chuck 25 is secured to the underside of workpiece 10 by adhesive or other detachable attachable means. A female extension 24 of chuck 25 fits over a male driveshaft 23. Male driveshaft 23 extends from seated support 22 which is firmly seated in floating casting 17. When workpiece 10 has been made as smoothly round as desired chuck 25 is removed from its perch on seated support 22 and workpiece 10 is detached. In applications where high speed sanding discs are employed or, generally, in order to prevent the workpiece 10 from flying off the jig while it is being rounded, a positive latch mechanism is employed to prevent female extension 24 from slipping off male driveshaft 23.

While specific embodiments of the woodworking jig of the present invention have been described herein they have been descriptive only and the scope of Letters Patent is intended to be limited solely by the scope and spirit of the appended claims.

I claim:
1. A woodworking jig for producing a smoothly round wooden workpiece, comprising:
   a pair of end castings for mounting in a fixed position on a stable surface, said end castings having at least one unthreaded guide rod and a threaded drag rod attached therebetween;
   a floating casting having a threaded internal bore for receiving said threaded drag rod and at least one unthreaded internal bore for receiving said at least one unthreaded internal guide rod, said floating casting having a male drive shaft affixed thereto on the upper side thereof;
   a chuck for detachable attachment to the center region of a workpiece, said chuck having a female extension for rotatably fitting over said male drive shaft; and
   a planar member rotatably attached to said stable surface, said planar member having a sanding disk attached thereto for contacting and abrading the edge of said wooden workpiece so that movement of said floating casting will force said wooden workpiece against said sanding disk and cause said wooden workpiece to rotate.

2. A woodworking jig in accordance with claim 1 wherein the point of contact between said edge of said workpiece and said sanding disk lies in the lower hemisphere of said disk.

3. A woodworking jig in accordance with claim 2 wherein two unthreaded guide rods are employed, said unthreaded guide rods pass through unthreaded internal bores in the vicinity of the ends of each of said end castings, and said threaded drag rod is positioned midway between said unthreaded guide rods.

* * * * *